US012775659B2

(12) United States Patent
Doken

(10) Patent No.: US 12,775,659 B2
(45) Date of Patent: Oct. 27, 2026

(54) SYSTEMS AND METHODS FOR PROVIDING MEDIA FOR CONSUMPTION IN A VEHICLE

(71) Applicant: Adeia Guides Inc., San Jose, CA (US)

(72) Inventor: Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/374,122

(22) Filed: Sep. 28, 2023

(65) Prior Publication Data

US 2025/0110983 A1 Apr. 3, 2025

(51) Int. Cl.

*G06F 16/435* (2019.01)
*G06F 16/438* (2019.01)
*G07C 5/08* (2006.01)

(52) U.S. Cl.

CPC ........ *G06F 16/435* (2019.01); *G06F 16/4387* (2019.01); *G07C 5/0816* (2013.01)

(58) Field of Classification Search

CPC ............... G06F 16/435; G06F 15/4387; G06F 16/4387; G07C 5/0816
USPC .......................................................... 707/732
See application file for complete search history.

(56) References Cited

U.S. PATENT DOCUMENTS 6,289,332 B2 * 9/2001 Menig .................... B60K 35/10 340/439
6,882,290 B2 * 4/2005 French ..................... G08G 1/20 340/988
9,305,555 B2 * 4/2016 Kato ........................ G10L 15/22
9,520,006 B1 * 12/2016 Sankovsky ............ G06Q 10/20
12,417,473 B2 * 9/2025 Wasserman ........ G06Q 30/0265
2010/0256861 A1 * 10/2010 Hodges ............. H04L 12/40006 701/31.4
2011/0224864 A1 * 9/2011 Gellatly ................. G07C 5/006 701/29.5
2011/0276401 A1 * 11/2011 Knowles ........... G06Q 30/0269 705/14.66
2014/0188920 A1 * 7/2014 Sharma ................. G06F 16/635 707/758

(Continued)

FOREIGN PATENT DOCUMENTS

CN 109416733 A * 3/2019 ............... B60R 1/00
CN 116238511 A * 6/2023 .......... B60W 30/182

(Continued)

OTHER PUBLICATIONS

"About responsive search ads," Google Ads Help, Retrieved from https://support.google.com/google-ads/answer/7684791?hl=en-GB#:, Retrieved on Apr. 7, 2025, 4 pages.

(Continued)

*Primary Examiner* — Phuong Thao Cao
(74) *Attorney, Agent, or Firm* — HG LAW LLP

(57) ABSTRACT

Systems and methods are described for providing media content to occupants of a vehicle. First data associated with a current use state of a vehicle is obtained. The first data is analysed to identify a contextual event regarding the vehicle. In response to identifying the contextual event, second data comprising media content data is requested. A media content item is generated, based on the media content data, relevant to the identified contextual event, and the media content item is provided for consumption by an occupant of the vehicle.

17 Claims, 11 Drawing Sheets

(56) References Cited

U.S. PATENT DOCUMENTS

| | | | | | |
|---|---|---|---|---|---|
| 2015/0266377 | A1* | 9/2015 | Hampiholi | B60K 35/10 455/466 |
| 2015/0302718 | A1* | 10/2015 | Konigsberg | A61B 5/18 340/576 |
| 2019/0320216 | A1* | 10/2019 | Liu | G06F 16/437 |
| 2020/0045358 | A1* | 2/2020 | Modi | H04L 67/125 |
| 2020/0090425 | A1* | 3/2020 | Senft-Grupp | G01R 31/3648 |
| 2020/0312172 | A1* | 10/2020 | Rönnäng | G06N 3/0499 |
| 2020/0329342 | A1* | 10/2020 | Beaurepaire | G06F 9/451 |
| 2021/0086778 | A1* | 3/2021 | Suthar | B60W 40/08 |
| 2021/0104159 | A1* | 4/2021 | Tsai | G08G 1/20 |
| 2021/0234932 | A1* | 7/2021 | Sobhany | H04L 67/52 |
| 2021/0237573 | A1* | 8/2021 | Jahns | B60K 35/10 |
| 2021/0237576 | A1* | 8/2021 | Jahns | B60K 35/10 |
| 2022/0169266 | A1* | 6/2022 | Isaac | B60W 50/0205 |
| 2022/0207924 | A1* | 6/2022 | Majerus | G07C 5/0808 |
| 2022/0348078 | A1* | 11/2022 | Yasuda | B60K 35/235 |
| 2023/0106673 | A1* | 4/2023 | Asghar | A61B 5/024 382/104 |
| 2024/0013164 | A1* | 1/2024 | Derouen | B60W 40/06 |
| 2025/0029610 | A1* | 1/2025 | Ehrlich | G08G 1/0962 |

FOREIGN PATENT DOCUMENTS

| | | | | | |
|---|---|---|---|---|---|
| DE | 102013221478 | A1 * | 5/2014 | G06Q 30/0207 |
| DE | 102014204227 | A1 * | 9/2014 | G06Q 30/0266 |
| DE | 102020107067 | A1 * | 9/2021 | |
| KR | 20200057810 | A * | 5/2020 | |
| WO | WO-2012070770 | A1 * | 5/2012 | B60K 35/00 |
| WO | WO-2019097134 | A1 * | 5/2019 | G06F 16/639 |
| WO | WO-2021084381 | A1 * | 5/2021 | G06T 7/0004 |
| WO | WO-2023220068 | A1 * | 11/2023 | G06F 40/103 |

OTHER PUBLICATIONS

"Create a responsive display ad," Google Ads Help, Retrieved from https://support.google.com/google-ads/answer/7005917?hl=en, Retrieved on Apr. 7, 2025, 4 pages.

"Creating Responsive Display Ads," Google Ads API, Retrieved from https://developers.google.com/google-ads/api/docs/responsive-display-ads/create-responsive-display-ads, Retrieved on Apr. 7, 2025, 2 pages.

"Engage listeners in a natural way with interactive audio ads," Amazon ads, Retrieved from https://advertising.amazon.com/resources/whats-new/interactive-audio-ads, May 12, 2022, 5 pages.

"Interactive audio ads," AdTonos, Retrieved from https://www.adtonos.com/advertiser-page/interactive-audio-ads/, Retrieved on Apr. 7, 2025, 13 pages.

"Ivy," QNX, Retrieved from https://blackberry.qnx.com/en/products/automotive/blackberry-ivy, Retrieved on Apr. 7, 2025, 12 pages.

"Large, creative AI models will transform lives and labour markets," The Economist, Retrieved from https://www.economist.com/interactive/science-and-technology/2023/04/22/large-creative-ai-models-will-transform-how-we-live-and-work, Apr. 22, 2023, 13 pages.

"Launched: Audio Ads to engage with users listening on YouTube," Google Ads Help, Retrieved from https://support.google.com/google-ads/answer/12920511?hl=en, Oct. 24, 2022, 1 page.

"OBD-II Codes Is Your Car Throwing a Code and You Don't Know What It Means?," Kelley Blue book, Retrieved from https://www.kbb.com/obd-ii/, Retrieved on Apr. 7, 2025, 11 pages.

"pyOBD—Open-source OBD-II diagnostics," OBDtester, Retrieved from https://www.obdtester.com/pyobd, Retrieved on Apr. 7, 2025, 2 pages.

Manning. C D., "Human language understanding & reasoning," Daedalus, vol. 151, Issue 2, 2022, pp. 127-138.

McCormick K., "Google Responsive Search Ads 101: Best Practices You Need to Know," Wordstream, Retrieved from https://www.wordstream.com/blog/responsive-search-ads, Dec. 1, 2023, 26 pages.

Morgan. M., "6 Best Practices for Responsive Ads on the GDN," Wordstream, Retrieved from https://www.wordstream.com/blog/ws/2018/07/23/responsive-display-ads, Nov. 27, 2023, 34 pages.

Wolfe. C., "Specialized LLMs: ChatGPT, LaMDA, Galactica, Codex, Sparrow, and More," Medium, Retrieved from https://web.archive.org/web/20230117095522/https://towardsdatascience.com/specialized-llms-chatgpt-lamda-galactica-codex-sparrow-and-more-ccccdd9f666f, Jan. 13, 2023, 3 pages.

* cited by examiner

Fig. 3

```
bluetoothctl
power on
agent on
default-agent
scan on
pair xx-xx-xx-xx-xx-xx
trust xx-xx-xx-xx-xx-xx
```

```
# cd pyobd-pi
# python obd_recorder.py
```

The logged data file will be saved under:

*/home/username/pyobd-pi/log/*

41

SYSTEMS AND METHODS FOR PROVIDING MEDIA FOR CONSUMPTION IN A VEHICLE

BACKGROUND

The present disclosure relates, at least in part, to systems and methods for generating and providing media content and, more particularly (but not exclusively), to systems and methods for generating and providing media content based on contextual events regarding a vehicle.

SUMMARY

Mapping and navigation systems can provide media content during a trip to an occupant on-board a vehicle. For example, in one approach, a system provides content to occupants based on their vicinity to a particular place associated with the content. However, such content may have little relevance to the actual situation of the occupants or the vehicle. This irrelevant content can cause annoyance to the occupants. Consequently, such content suffer from low user engagement and negatively affect occupant's experience. Additionally, providing content in this manner would take up a significant amount of processing and navigation resources which reduces overall system efficiency without any real benefit to the occupants.

It is therefore a first non-exclusive object of the disclosure to provide a method and a system which solves the above problem. A method and a system disclose herein may facilitate providing media content to an occupant that is relevant and addresses a specific, real need of the occupant or the vehicle. This in turn may improve system efficiency for the provided media content while also enhancing user experience. Specifically, some of the disclosed techniques leverage extensive data that is only available locally at the vehicle (e.g., OBD or ECU data). Historically, such data has not been utilized to tailor content delivery to a particular user or vehicle. Rather, such data has typically been used for diagnostic purposes.

According to a first aspect, there is provided a method comprising: obtaining first data associated with a current use state of a vehicle, analysing the first data to identify a contextual event regarding the vehicle, in response to identifying the contextual event, requesting second data comprising media content data, generating, based on the media content data, a media content item relevant to the identified contextual event, and providing the media content item for consumption by an occupant of the vehicle. The use state may be a state relating to an operational parameter of the vehicle and/or occupant parameter. Operational parameters may include at least one of vehicle sensor output, Vehicle Identification Number (VIN) data, navigation data, one or more codes read from an Electronic Control Unit (ECU) or On-Board Diagnostics (OBD) port etc. Occupant parameter may include the state of the occupants, e.g., measured from a vehicle sensor, and/or taken from a user device in operational communication with the vehicle and/or a server. The contextual event may be an incorrect tyre pressure, certain fuel status, light bulb status, air conditioning status, desired food/drink by the occupants, desire to visit certain clothing store.

In an embodiment, the first data comprises data indicative of a state of the vehicle (e.g., indicative of a state of vehicle motion, a state of one or more vehicle components, a state of one or more vehicle passengers, a state of one or more detectable objects or people external to the vehicle, a state of environmental or ambient conditions external to the vehicle, etc.). For example, in an embodiment, the first data comprises at least one of location data, velocity data, diagnostic data, vehicle control data, physical health data, mood data, speech data or image data indicative of a state of occupants of the vehicle.

In an embodiment, the method comprises determining a severity and/or urgency of the contextual event, and generating the media content item relevant to the identified contextual event based on the determined severity and/or urgency. The severity and/or urgency may be determined based on a threshold value and/or a predetermined scale. The advantage of determining severity and/or urgency is that a priority level for addressing a specific need associated with an occupant or the vehicle may be determined and a media content item most relevant to the identified contextual event may be generated. For instance, when the contextual event relates to a mechanical issue with the vehicle, the severity and/or urgency may be determined as high or maximum, thus generating a media content item specifically relevant to the identified contextual event may be prioritised.

In an embodiment, the method comprises identifying a severity and/or urgency value for the contextual event, and comparing the identified severity and/or urgency value with a pre-determined threshold value.

In an embodiment, the method comprises identifying a severity and/or urgency value for the contextual event, and comparing the identified severity and/or urgency value with a predefined severity and/or urgency scale comprising a minimum value and a maximum value.

In an embodiment, the method comprises determining whether the occupant of the vehicle is a passenger or a driver of the vehicle, and determining the format of the media content item based on whether the occupant of the vehicle is a passenger or a driver of the vehicle. The format may be an audible format and/or a visual format. Additionally, the format may be an interactive format. This may facilitate delivery of the media content in a manner that is least distractive to a person such as a driver or delivery of the media content in a manner that is most engaging for a passenger of the vehicle.

In an embodiment, the method comprises receiving at least one query from the user with respect of the media content item, analysing the at least one query based on a machine learning model, providing a response to the user query based on the output of the machine learning model, and generating a variant of the media content item based on the at least one query and/or the output of the machine learning model, sorting the generated variant in a media content item data set, collecting data indicative of a response by one or more occupants to the generated variant. The newly generated variant of the media content item may include the response to the query so that the new variant pre-emptively answers an occupant's query when it is delivered in future.

In an embodiment, the method comprises detecting an error code associated with the vehicle in the first data, wherein the error code is indicative of a fault in the vehicle. This may allow proactive detection of a fault in the vehicle and prompt guidance to a place of business where the fault can be remedied.

In an embodiment, the second data comprising media content data comprises a media content queue sequence. The advantage of a queue sequence is that an order by which the media content is to be delivered may be determined based on the identified contextual events.

In an embodiment, the method comprises modifying the media content queue sequence based on a determined severity and/or urgency of the contextual event. This allows providing media content associated with a severe and/or urgent contextual event out of order from the predetermined sequence so that needs of the occupants can be addressed dynamically and promptly.

BRIEF DESCRIPTION OF THE DRAWINGS

FIG. 3 depicts an exemplary code to get a data load according to the present disclosure.

DETAILED DESCRIPTION

The present disclosure provides systems and methods for providing media content for consumption to occupants of a vehicle. The media content may be provided in audio format (e.g., while the vehicle is being driven), and the media content may be provided in video format (e.g., while the vehicle is stationary).

"Media content" may refer to multimedia information that may be transmitted, received, stored, or output (e.g., displayed) in a manner consistent with the described techniques. Media or multimedia information may be or include a combination of content forms that may be played or provided in a presentation (e.g., for consumption by a user), such as text (e.g., raw text or hyperlinks), audio (e.g., speech or music), image(s), video(s), scene data or models for rendering 3D scenes, 3D renderings (e.g., rendered from scene data), or haptic information for generating haptic feedback. When provided by way of an output device (e.g., a display, speaker), media content may include consumable or observable audible, visual, or tactile aspects. Media content may be or include interactive media that enables a user to control or manipulate the way the interactive media is presented (e.g., video games). Media content may be delivered for real-time output (e.g., live streamed), or for storage and subsequent retrieval and output. Examples of media content include movies; shows; recordings, streams, or broadcasts of events (e.g., sporting events, concerts, etc.); video clips (e.g., available via social media); video games (e.g., including cut scenes); or extended reality content.

Figure 1:
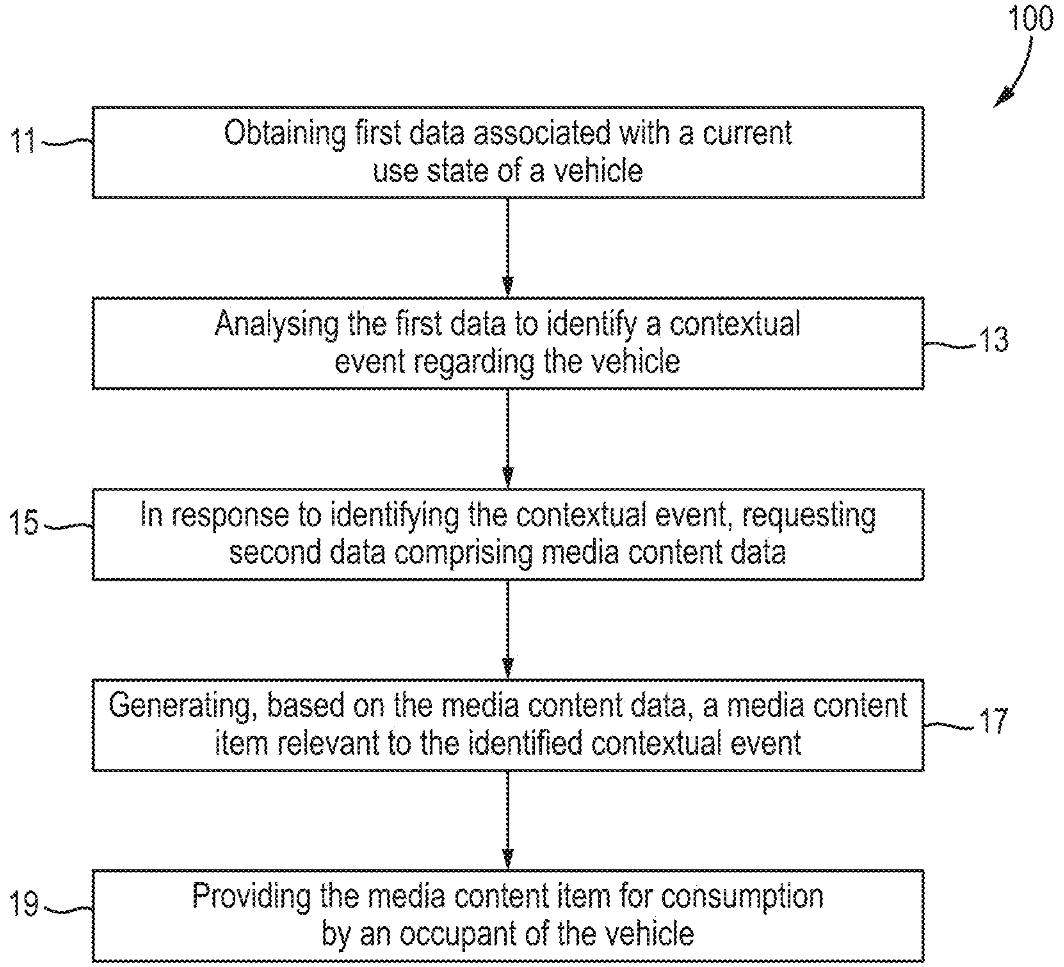
FIG. 1 depicts a flow chart of a method for providing content to an occupant of a vehicle according to the present disclosure.

FIG. 1 illustrates a flow chart of an example method 100 for providing content to an occupant of a vehicle according to the present disclosure. The method 100 may be implemented, in whole or in part, by the system 1001 shown in FIG. 11. One or more actions of the process 100 may be incorporated into or combined with one or more actions of any other process or embodiments described herein. The method 100 may be saved to a memory or storage (such as any one or more of those shown in FIGS. 11) as one or more instructions or routines that may be executed by a corresponding device or system to implement the method 100 (e.g., by the processor 115 shown in FIG. 11).

Figure 11:
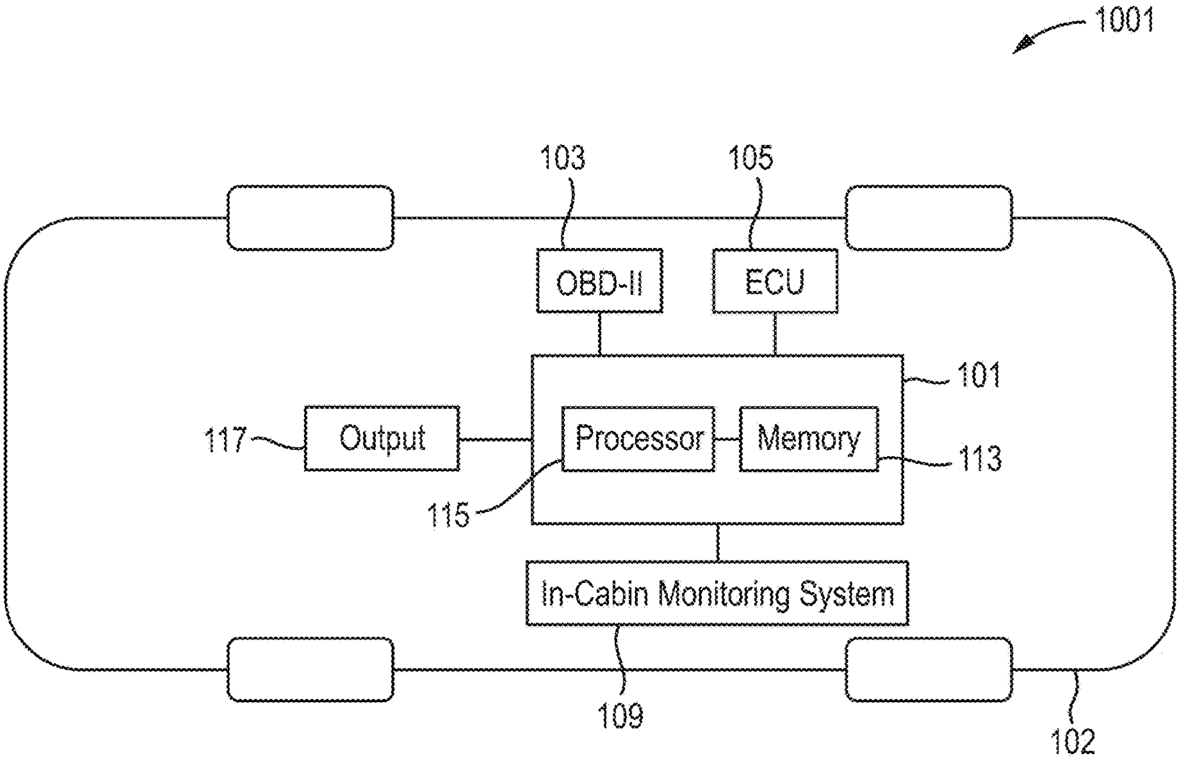
FIG. 11 depicts an exemplary vehicle according to an embodiment of the present disclosure.

At step 11, a first data associated with a current use state of a vehicle, such as the vehicle 102 shown in FIG. 11, is obtained. In an embodiment, the first data may be obtained using the OBD-II port 103, the ECU 105, or the in-cabin monitoring system 109. The use state may be a state relating to an operational parameter of the vehicle and/or occupant parameter. The operational parameter may include at least one of vehicle sensor output, Vehicle Identification Number (VIN) data, navigation data, Electronic Control Unit (ECU) data, On-Board Diagnostics (OBD) data, etc. The occupant parameter may include a current state of the occupants measured from a vehicle sensor, and/or taken from a user device in operational communication with the vehicle and/or a server. The current state of the occupants may be that at least one occupant is hungry or thirsty, needs to use a restroom, the occupant is tired and requires rest and/or other emotional or physical needs of the occupant.

In step 13, the first data is analysed (e.g., by the control circuitry 101 of the system 1001 shown in FIG. 11) to identify a contextual event regarding the vehicle. Data representing or indicating the contextual event may be stored to memory (e.g., the memory 113). Generally, a contextual event is an occurrence or status change relating to a context relevant to the vehicle. A context relevant to the vehicle may be any set of circumstances or conditions defining or relating to the setting in which the vehicle exists (e.g., a context may affect operation of the vehicle). The circumstances or conditions may be internal or external to the vehicle, or may correspond to the vehicle itself (e.g., as a whole). Example contexts for a vehicle include: a state of vehicle motion, a state of vehicle condition, states of vehicle components, states of occupants of the vehicle; ambient conditions internal and external to the vehicle; states of objects or people in the vehicle's environment; etc. Example contextual events may include low tyre pressure, a specific fuel status, status of lighting system in the vehicle, air conditioning and/or ambient temperature level, desired food/drink by the occupants, or an inferred or detected desire to visit certain clothing store or others.

In step 15, in response to identifying the contextual event, second data comprising media content data is requested (for example by a system implemented in the vehicle or a remote server such as a Demand Side Platform (DSP)). In an embodiment, the control circuitry 101 shown in FIG. 11 may request the second data. The second data may be stored remotely or locally. The second data may be stored locally on a computer on-board of the vehicle. Alternatively, the second data may be generated and stored on a Supply Server (SP) remote to the vehicle and wirelessly transmitted to the vehicle from the SP upon request.

In step 17, a media content item relevant to the identified contextual event is generated based on the media content data. The generated media item may be generated based on one or more data set stored locally or remotely. In an embodiment, the control circuitry 101 shown in FIG. 11 generates the media content item. In an embodiment, a sever or other system in communication with the control circuitry 101 generates the media content item In step 19, the media content item is provided for consumption by an occupant of the vehicle (e.g., by the control circuitry 101 and/or at the output system 117 shown in FIG. 11). The media content item may be a video and/or audio track.

Figure 2:
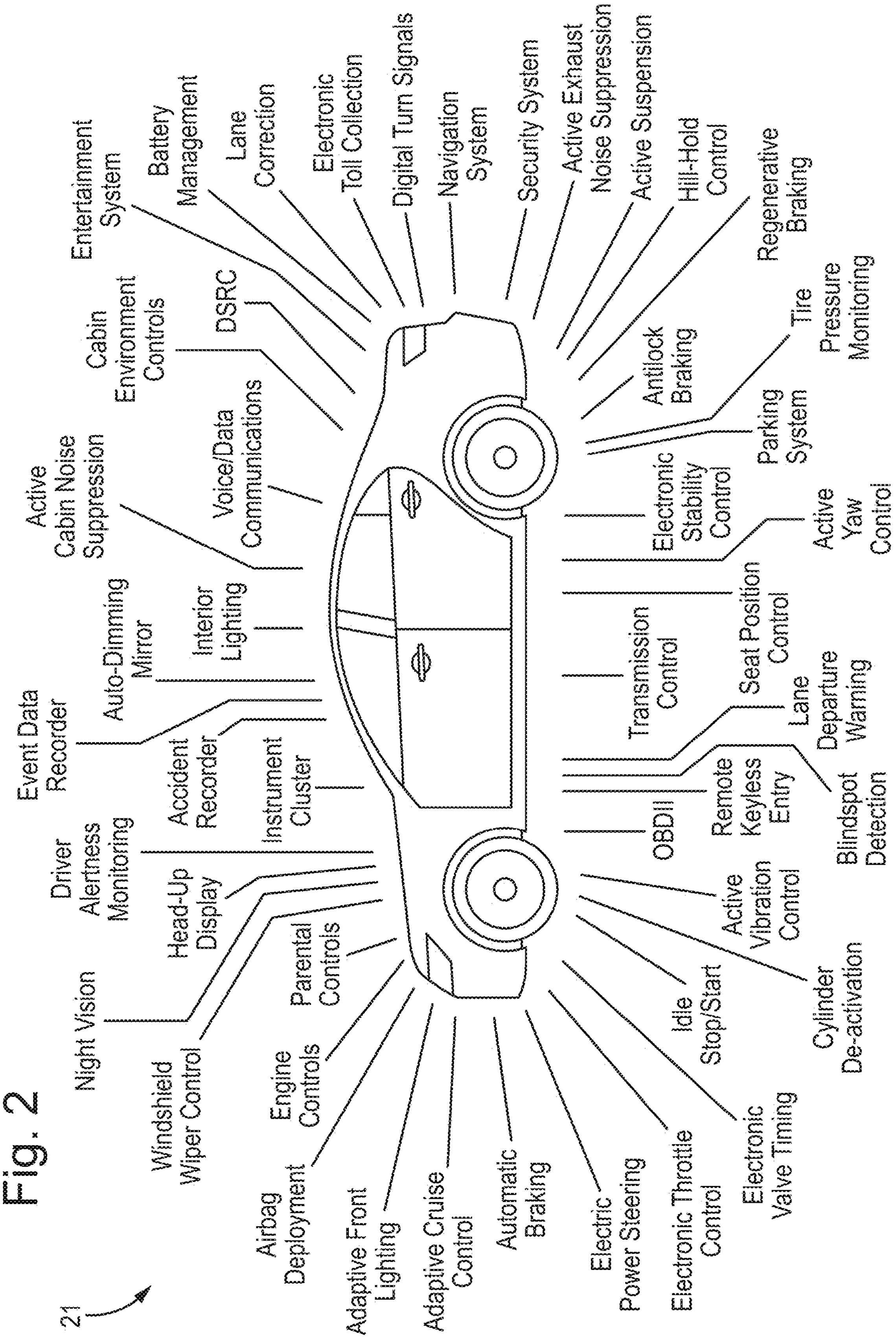
FIG. 2 depicts an exemplary vehicle according to an embodiment of the present disclosure.

The operational parameters may include at least one of location, velocity, or radius parameter to a particular point of interest or region of interest. As illustrated in FIG. 2, additionally or alternatively, the vehicle 21 may provide additional operational parameters indicative of the status of the vehicle. These data may include at least one of Airbag Deployment, Adaptive Front Lighting, Windshield Wiper Control, Adaptive Cruise Control, Automatic Braking. Electric Power Steering, Electronic Throttle Control, Night Vision. Electronic Valve Timing, Engine Control, Parental Controls, Head-Up Display, Event Data Recorder, Driver Alertness Monitoring, Idle Stop/Start, Accident Recorder, Instrument Cluster, OBD II, Active Vibration Control, Remote Keyless Entry, Active Cabin Noise Suppression, Auto-Dimming Mirror, Interior Lighting, Cabin Environment Controls, Transmission Control, Seat Position Control, Lane Departure Warning, Cylinder De-activation, Blindspot Detection, Voice/Data Communications, Electronic Stability Control, Antilock Braking, Parking System, Active Yaw Control, Dedicated Short-Range Communication (DSRC), Tire Pressure Monitoring, Entertainment System, Battery Management, Lane Correction, Electronic Toll Collection, Digital Turn Signals, Navigation System, Security System, Active Exhaust Noise Suppression, Active Suspension, Hill-Hold Control, Regenerative Braking.

In some embodiments, at least some of these data may be obtained and/or determine by analysing error codes that are readable from the OBD-II port. The operational parameters and/or the occupant parameters may be utilised to order, filter and/or prioritise certain media content for providing to occupants. The operational parameters of the vehicle provide a perspective from the vehicles point of view as to the current context and state of the vehicle. Generally vehicles have more than 100s of ECUs and data is collected from them continuously to understand the state of the vehicle. Some of these feed into error codes that are readable from the OBD-II port. In some embodiments, data from OBD-II port is collected and transmitted by using a wired connection and/or a wireless communication to the vehicle's infotainment headend.

As one example, one or more attachment devices may be plugged into OBD-II port and the data may be read wirelessly via any appropriate wireless communication standard (such as Bluetooth (BT)). By using BT, data or codes from the OBD-II port can be made available to the vehicle infotainment headend. This may require a conversion process that can leverage a BT OBD-II port scanner.

In some embodiments, other communication standards such as Wi-Fi versions may be used. Alternatively, a basic connection via a Rasperry Pi, and an open source PhyOBD OBD-II (SAE-J1979) compliant scan tool software may be written entirely in Python which can be utilized to obtain the readings. Codes or data obtained in this manner can be broad, anything from a faulty catalytic converter to a burned out tail light. Moreover, data from other sensors such as tire-pressure monitoring system can also be aggregated using these methods. FIG. 3 illustrates an exemplary code including a pair, login, read process to get a data load.

Figure 4:
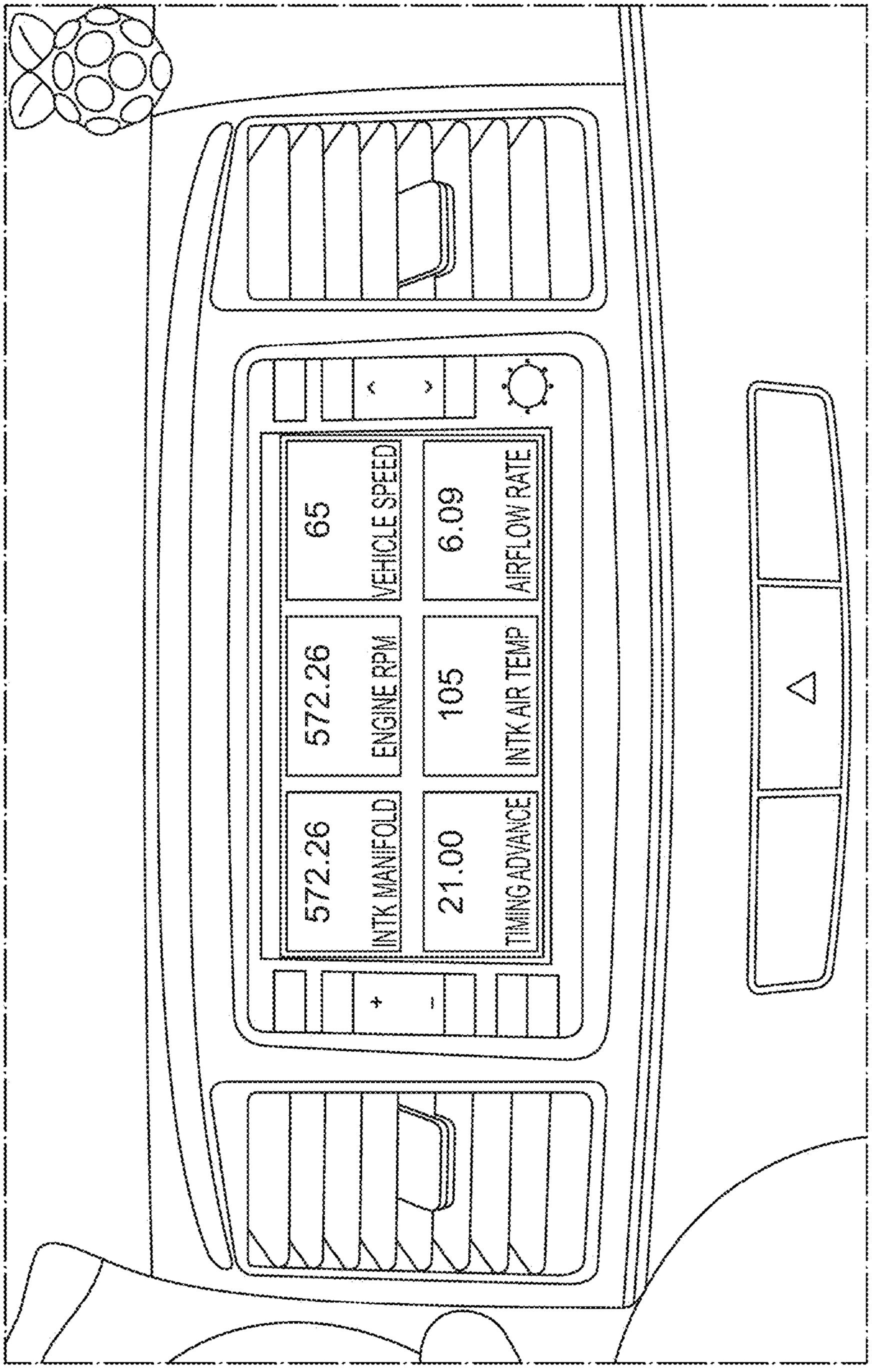
FIG. 4 depicts an exemplary vehicle head end displaying relevant ECU codes.

In some embodiments, all ECU codes may be communicated via Controller Area Network buses, Ethernet Bus or FPD Link within the network and eventually be made accessible to the headend that navigation systems interact with. FIG. 4 illustrates an exemplary vehicle head end 41 displaying relevant ECU codes.

In some embodiments, media content data requests are sent from the vehicle when error codes are detected (by mapping codes to particular need or business type) as well as other basic needs such as low fuel tank level or tire pressure below acceptable limits. Media content data associated with each request may be stored in a queue to be provided for consumption by occupants.

In some embodiments, a level of severity and/or urgency of each requests may be determined. The level of severity and urgency may be determined by a vehicle head end unit or a supply server. In one example when a serious issue such as an issue with the vehicle lighting system or an engine issue is detected, a media content data including information regarding a repair shop will be more appropriate and thus will have a higher priority in the queue. Any identified contextual event indicative of such serious need from the vehicle may lead to prioritizing media content data that can help with more serious issues. Thus, a port reading may be converted to a media content request based on identifying a contextual event (such as incorrect air pressure in tires etc.). In another example, low tire pressure means that the severity is high, and a media content data associated with such low tire pressure may be pulled up even if its position in the media content queue is low.

In some embodiments, assessing the contextual event may be mapped based on the received codes and the severity of the request may be mapped based on where the data read falls under the acceptable range for the data. For instance, when a recommended tire pressure range is 29-30 psi and the current tire pressure is 21 psi, a request associated with this contextual event may be determined as an urgent request. In some embodiments, a context specific threshold may be set in the system. For example, a threshold of 25 psi may be set specifically in relation to tire pressure. When a current read of air pressure in one or more tires is 21 psi, indicating that the current read value is below the threshold of 25 psi, the system may determine a request associated with this contextual event as urgent. In some embodiments, multiple thresholds may be set in the system. For example, a first threshold of 29 psi may be set as the lowest pressure in a recommended range and a second threshold pf 25 psi may be set as an urgent threshold. A "moderate" urgency may be assigned for tire pressures between the first and second thresholds. Urgent requests may, in addition to signaling prioritization of media content associated with these request (for example moving to a higher position in a media content queue sequence), signal selecting/sorting of media content data based on a radius distance from the current GPS location to a business sponsoring the media content data in order to make an attempt to find the nearest business that can assist and resolve an identified situation.

In some embodiments, any identified issues that is associated with a recall, for example a backup camera not working (against NHTSA rules) which may be detected/communicated via FPD-link may be marked as high severity by default.

Alternatively and/or in addition to the previous examples, occupant's reactions to media content items provided to the occupants may be identified by using in-cabin monitoring (e.g. computer vision) such as analyzing gestures, smiling, frowning, thumbs up/down or even subtle and simple gestures such as head nod. Such data may be associated with a media content and interpreted as the media content being liked or disliked and the navigation to the provider of the media content may be initiated or ignored.

If the vehicle is an autonomous vehicle (AV), then the drive decision to a location associated with a provided media content data may be commands issued to both the navigation and drive-by-wire system.

In some embodiments, subtle gestures may be used by drivers since they are busier cognitively due to being focused on driving, versus passengers. When allowed by the user, conversation that is happening within the vehicle cabin will also be analyzed by a microphone detection using Natural Language Processing (NLP) methods to determine media content data more appropriate. For example, when there is a conversation about food that is happening in cabin, then a media content data including information about food may be queued (i.e. prioritized) ahead of another media content data including information about a furniture store.

Figure 5:
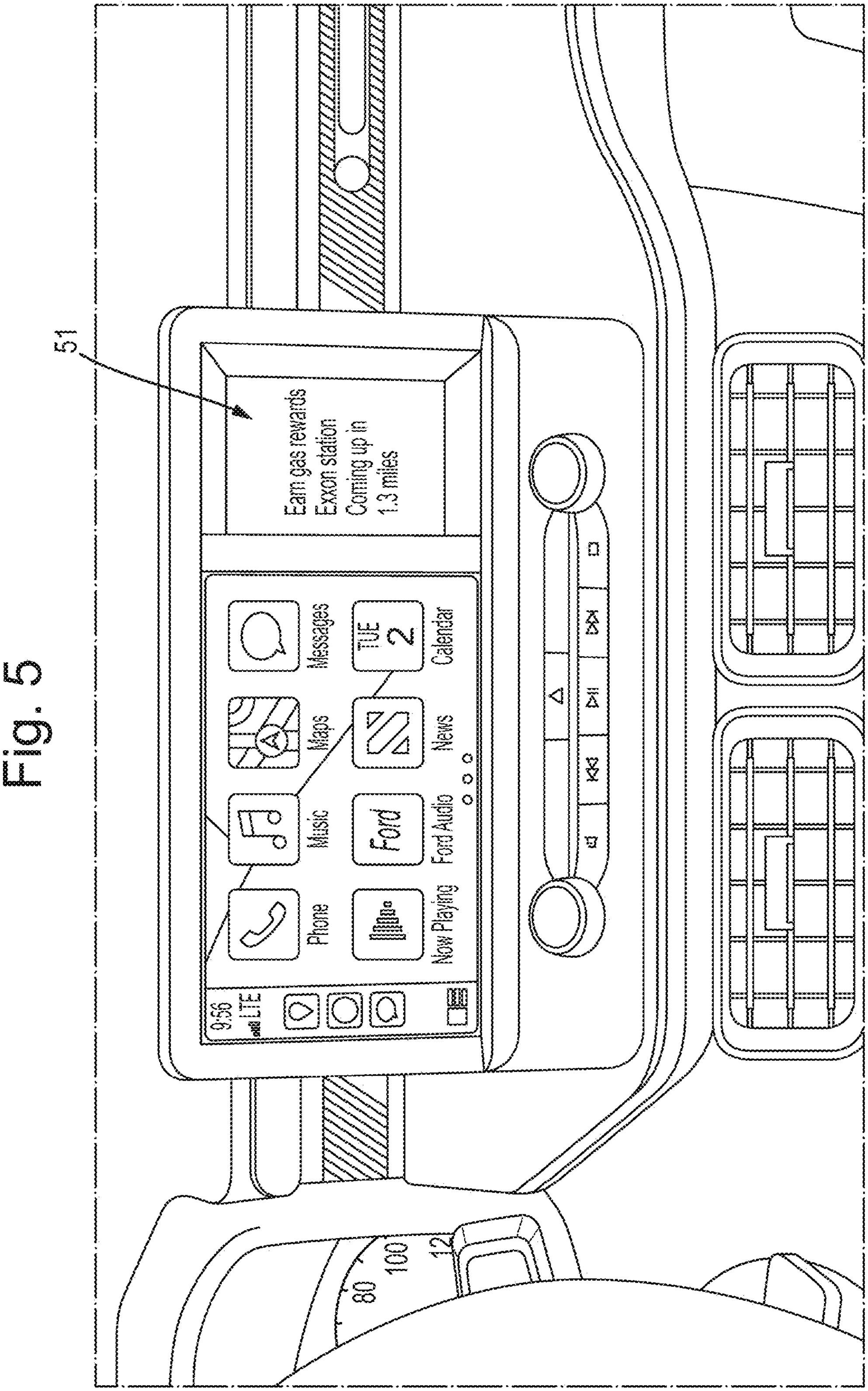
FIG. 5 depicts an example of a media content item according to the present disclosure.

In some embodiments, media contents may be turned off by an occupant (such as a driver) at any time or can be filtered based on a business type. An occupant may turn off different one or more categories of media contents, for instance he/she may want to receive audio media content including information regarding gas stations, drive thru restaurants, coffee shops but not from book stores. In addition, media content being in audio format may be buffered and may only be provided when it is detected that there is no navigation instruction being currently played out and no human chatter is detected in the cabin of the vehicle. FIG. 5 illustrates an example of a media content item 51 in audio format being delivered in the vehicle.

Figure 6:
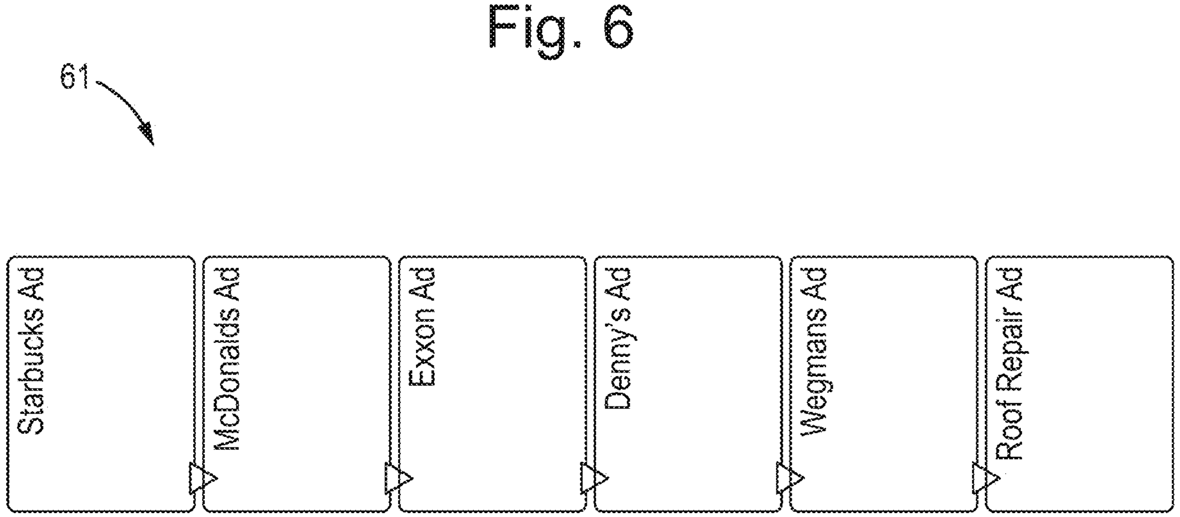
FIG. 6 depicts an exemplary media content queue sequence according to the present disclosure.

In some embodiments, media contents may be pushed by a Supply Side Platform (SSP) and pulled by a Demand Side Platform (DSP). FIG. 6 shows a media content queue sequence 61 based on a real time bidding process. The order of the media content in the media content queue may be based on factors such as distance to the vehicle and/or a level of premium paid by the sponsor of each media content. The media content may also be ordered based on a speed of the vehicle, as well as how far the location of a business is to the vehicle. In some embodiments a real time bidding may occur between the DSP and SSP to match the demand with the supply. For instance if a need of the occupants is determined as urgent (see examples of determining severity and/or urgency below), a sponsor may need to pay higher premium to be positioned at a higher order in the bidding process.

In some embodiments, the order of media content in the queue may be modified based on a particular identified contextual event and optionally based on a level of severity and/or urgency of the contextual event. For instance, if the contextual event is identified as low fuel level or incorrect air pressure in tires, the media content associated with Exxon may be prioritized in the queue sequence. This may only happen if a metadata associated with the Exxon media content indicates that Exxon is a fuel station or that there is an air pump at the upcoming Exxon station respectively.

In some embodiments, a threshold value may be set as a threshold for indicating severity and/or urgency of an identified contextual event. The threshold value may be an integer value, for instance $n=3$. In this case, contextual events may be pre-categorized and assigned at least one severity and/or urgency value. For instance, a contextual event such as a tyre puncture may be assigned a severity and/or urgency value $x=4$ where x is the severity and/or urgency value and another contextual event such as wiper fluid being below a recommended level may be assigned a severity and/or urgency value $x=1$. When a contextual event (such as the aforementioned examples) is identified the severity and/or urgency value is compared to the threshold value and if it is determined that the severity and/or urgency value of the identified contextual event meets certain condition (such as being above the threshold value, that is $x>n$), then it is determined that the identified contextual event requires urgent attention. In other examples, the severity and/or urgency value of the identified contextual event may be compared to a predetermined scale to determine whether identified contextual event requires urgent attention. The predetermined scale may be a numerical scale indicating least urgent to most urgent as the magnitude of values in the scale increases, for instance the value of 0 being least urgent and a maximum value of 100 being most urgent. It should be appreciated that the examples provided herein are merely exemplary and non-limiting and in other embodiments, the threshold value may have other types or forms of values such as non-integer value, Boolean value etc.

In some embodiment, dynamic premium is used for prioritizing certain media content. The Supply Side Platform may charge a higher premium since the Supply Side Platform will be bidding specifically for a media content that either was not already in the queue or had a lower position in the queue. For example, when the in-cabin monitoring system detects chatter about tacos, a media content associated with a Mexican restaurant or Taco Bell may be desired and since it was in the buffered queue, SSP may ask for a higher bid price.

In some embodiments, the in-car monitoring system is used to determine whether an occupant of the vehicle is a passenger or a driver of the vehicle, and the format of the media content item is determined based on whether the occupant of the vehicle is a passenger or a driver of the vehicle. For example, the in-car monitoring system may use images obtained from a camera in the cabin to determine whether the occupant of the vehicle is a passenger or a driver of the vehicle. Alternatively other methods such as audio triangulation using multiple microphones may be used to determine the location of the occupant in the cabin and consequently determine whether the occupant is a passenger or driver. The format may be an audible format and/or a visual format. An audible format may be more suitable when the occupant is a driver, as audible media contents do not require the driver to look away from the road. However a visual format may be more suitable when the occupant is a passenger because visual formats such as a video clip may be most attention grabbing and engaging for the occupant.

In some embodiments, a response period is set so that after a media content item is provided to occupants of a vehicle the head unit listens for a response from the occupants. The response may be an immediate explicit verbal skip/next, navigate to the business or stop command. Stop means stopping all media contents after that point in time. If there is no response received during the response period, it is assumed that the occupant(s) were not interested in that specific media content and the next buffered media content will be in line for delivery. Visual response can be also collected from the vehicle occupants during the methods described above.

In some embodiments, a limit on the rate at which media content is provided to occupant(s) is set. The limit may be set for the duration of a drive (since the destination is known based on navigation system). This may insure that a frequency of the media content provided to the occupants is reasonable thus balancing a nuisance factor for the occupant(s) and the desire of the fee paying sponsor to provide media contents.

In some embodiments, a media content in video format may be converted to audio only format. information can be extracted from the media content in video format (for example by analyzing frames of the video) and converted to an audio only format suitable for providing using speakers in the vehicle. In some embodiments a video stream (i.e. a media content in video format) is split into video and audio data and only the latter is rendered. Alternately a text-to-speech is used to produce audio data base don a sub-title portion of the video stream.

In some embodiments, occupants such as driver or passengers may interact with a media content provided to them in the vehicle. As one example, the occupant(s) may ask questions about the content or information included in the media content, for instance when the media content provides information about a particular business, the occupants may request further information about the business. Returning to the Exxon example, the questions may be, e.g., "Is there an ATM at the station?," "Is there an air pump?, "Do you have ethanol free unleaded gasoline and at what price?," "Do you accept Apple Pay?," "Is there a restroom?," "Is the restroom wheelchair accessible?," etc.

Queries from the occupants about a media content item may be transmitted to a Chat Agent of a server that will provide appropriate answered to the queries. In one example, the questions may be analysed and answered by using a Business specific Language Model (BLLM) using data sets provided by a particular business. Business specific data sets and the BLLM model/chat agent may be abstracted from each other. The BLLM may be invoked via an API accessible by the server. Optionally the BLLM model/chat agent may be accessible by other applications via an API server.

In some embodiments, information about a place of business may be accessed or obtained from available sources on the internet. For example, information may be obtained from the Google Map business details, or the review/comment sections populated by other users.

The driver of the vehicle may not read that sort of information while driving nor would they have time to do so to make a selection of whether they want to direct the navigation to a business. Therefore, the systems and methods according to the present disclosure may facilitate providing information to the driver without causing distraction.

In some embodiments, a specialized BLLM specific to a business may be used to avoid funky or biased answers (generally seen for large models). Domain-specific pre-training, model alignment, and supervised fine-tuning may be used to ensure that user questions about a specific business can be answered in an expert fashion. As one example, a McDonalds specific BLLM may be used which is an expert on all McDonalds related questions such as meals, burgers, drinks, prices, business hours, drive thru specifics but will not be able to answer and even ignore questions about avocados or climate change.

Figure 7:
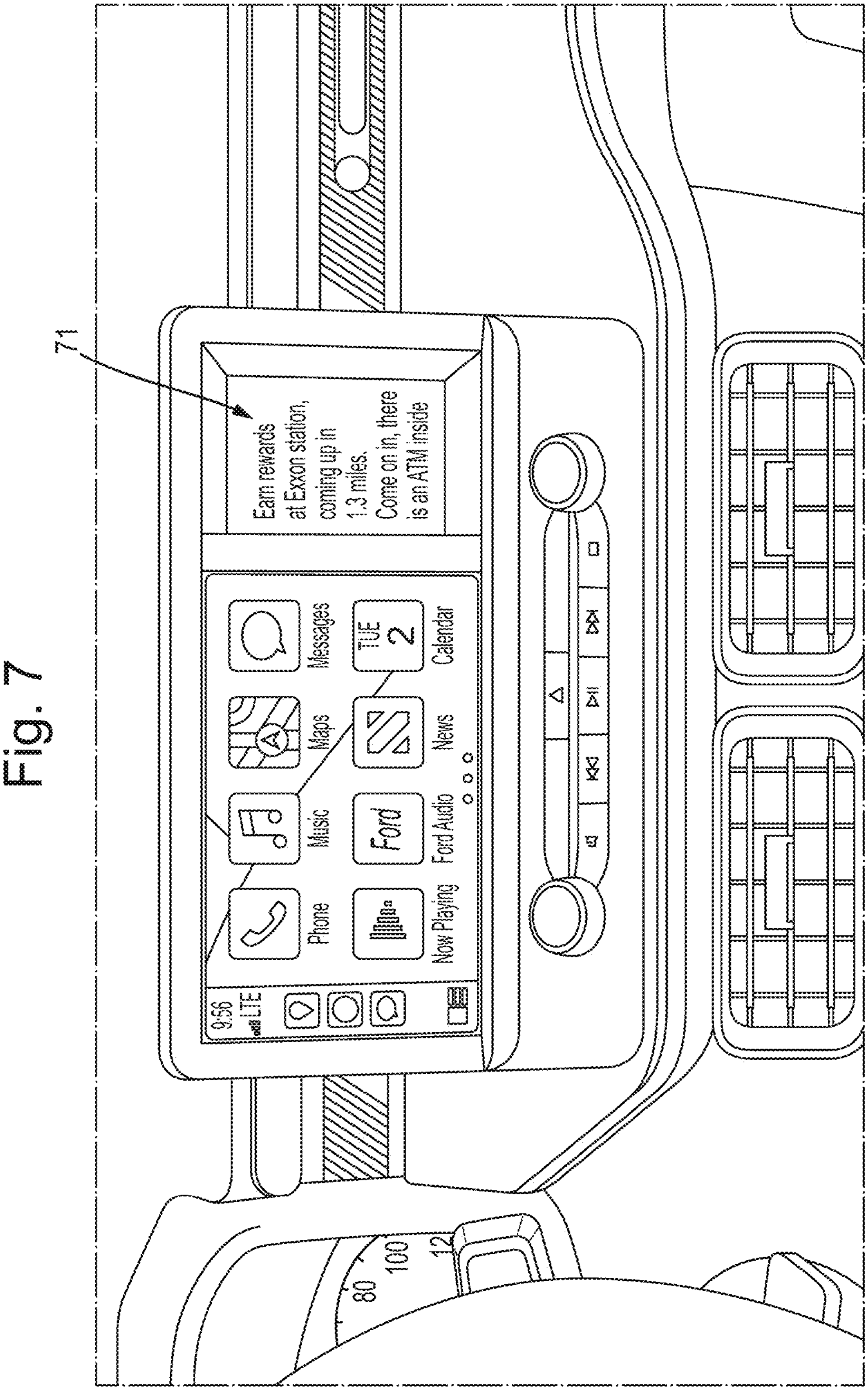
FIG. 7 depicts an exemplary modified media content according to the present disclosure.

In some embodiments, when a statistically high number of questions are coalescing around the same topic, for example 20% of the questions are related to the presence of an ATM, a media content that is intended to be delivered to occupants in the future may be modified to include the answer to that question. In one example, the information relating to the most asked question is simply appended to the original media content. FIG. 7 illustrates such a modified media content 71 in audio format being delivered in the vehicle.

Figure 8:
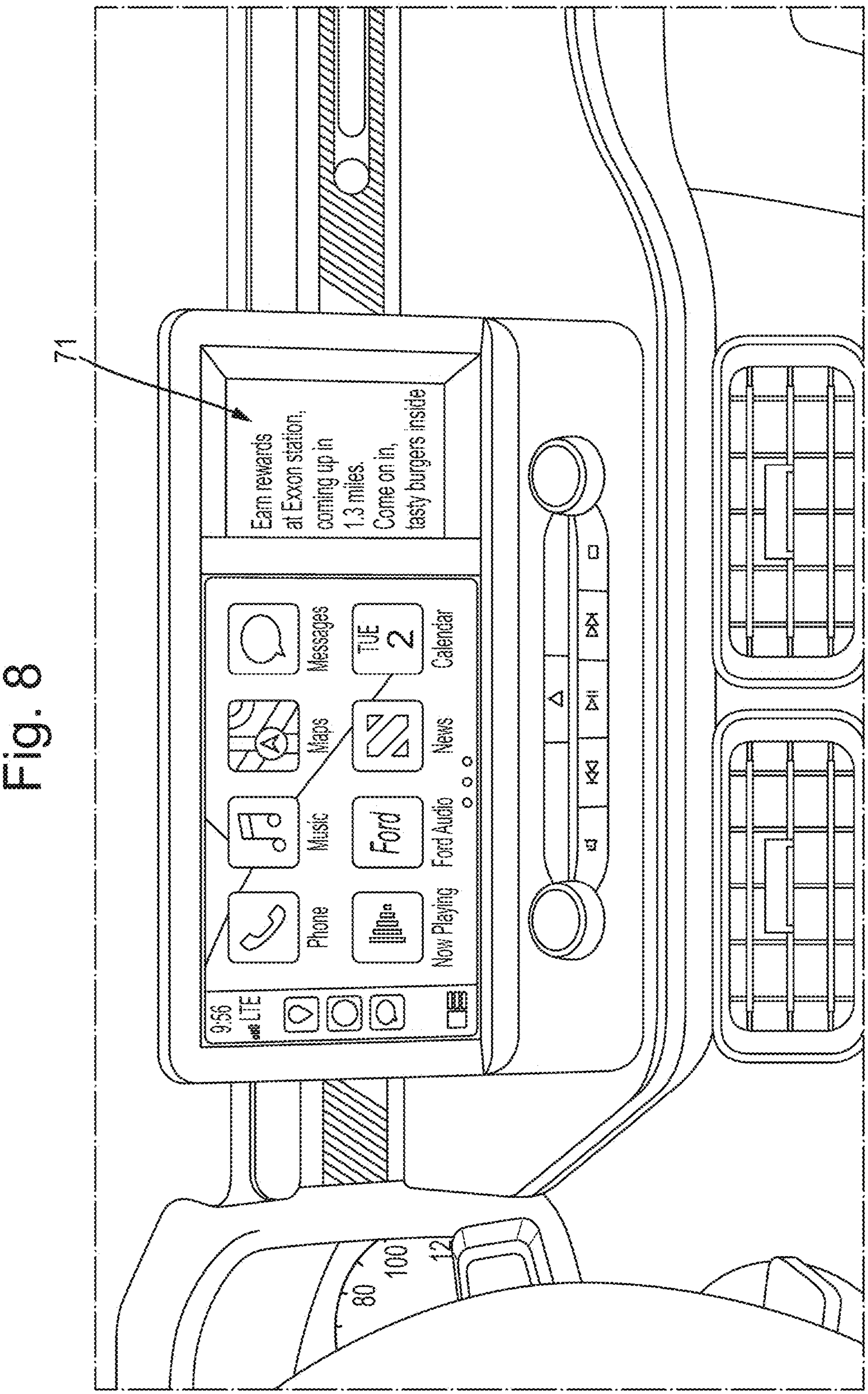
FIG. 8 depicts an exemplary modified media content according to the present disclosure.

In another embodiment, an answer to a question may be included in the media content based on comments from other users in a review section. For instance, if multiple comments make a referral to commenters' views about the food rating of a particular place of business when the asked question concerns food rating, the media content may be modified to include information about food rating. FIG. 8 illustrates such a modified media content 81 in audio format being delivered in the vehicle.

In some embodiments, a media content may be modified based on a general profile of the driver/passengers. If the driver often asks a fuel price after a media content containing information about a fuel station is provided, a modified version of the media content that includes the price at the fuel station will be generated and delivered to vehicle before the particular question is asked. This will require a metadata field associated with the media content which is dynamic that keeps the fuel price and updates its value by checking the provider's current data store. In some embodiment, the BLLM may define what metadata fields will be dynamic and need to be updated per time, per location and context.

In some embodiments, a media content may be modified based on the condition of the vehicle or the other contextual parameters. For instance, if the vehicle had incorrect tire pressure (based on data collected from the vehicle), a media content will be modified to include information about the presence of an air pump equipment at a particular place of business. In another example, when there is a big lottery prize currently, a media content can be modified to include the amount of the lottery prize. This means, a business may have several versions of the base media content and multiple variants that were generated based on interactions of users with a Chat Server and the BLLM model using the data store and enhanced data models of the business.

Figure 9:
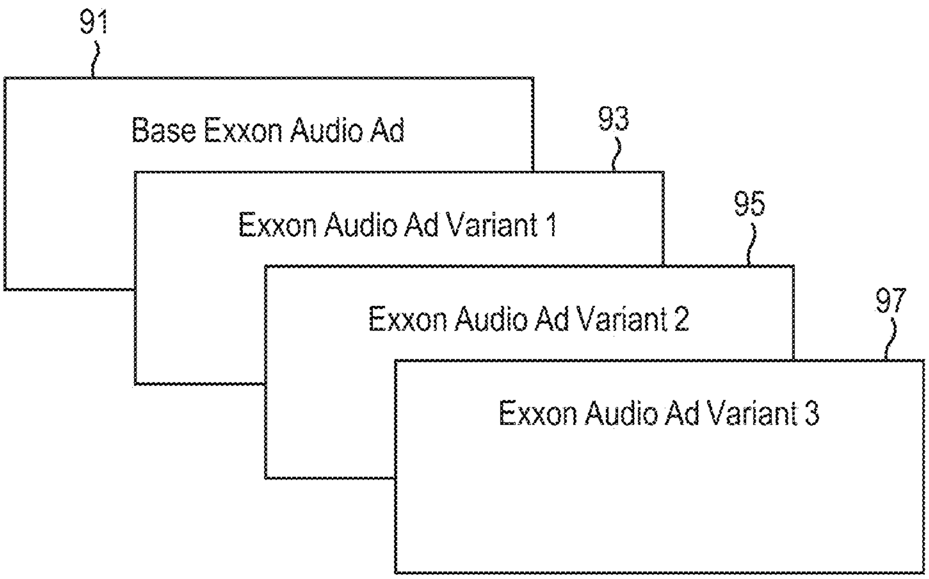
FIG. 9 depicts an exemplary base media content and several variants of the base media content according to the present disclosure.

FIG. 9 illustrates the base media content 91 containing information regarding an Exxon fuel station and a first variant 93, a second variant 95 and third variant 97 of the base media content 91. For instance, the first variant 93 may have metadata to indicate that it has data about ATM, the second variant 95 may have metadata to indicate that Apple Pay is accepted, the third variant 97 may have metadata to indicate that there are public restrooms.

In some embodiments, interaction with the Business LLM Chat Agent can be done not only by voice but also on a smart device chat interface, such as a smartphone. This assumes that smart devices that are in cabin are wirelessly connected to the headend (for example using Bluetooth) and also receive the media content. In this embodiment, they will be able to respond via text using the BLLM's chat interface. In some embodiments, this functionality may be limited to only the passengers. In another related embodiment, BLLM chat interface may process the requests from the aggregate driver and passengers, collate votes if needed and answer them accordingly. In another embodiment, queued media contents may pull in variants of the media content based on the questions answered by the chat agent of BLLMs from the vehicles that are in the same vicinity of one vehicle, based on GPS measurements. For instance, if a traffic jam exists at a location, and questions are received by a plurality of vehicles relating to a coffee shop in an upcoming rest stop, a first vehicle may be queued with media content variants which answers these very questions pre-emptively.

Additionally, a business can monitor the effectiveness of each media content variant (with respect to the base media content) at any time to modify their campaign by weighting more towards a variant versus another. Metadata of each variant, about how they were generated (based on what sort of driver/passenger input) will be recorded and shared as metadata. The weightings of a variant may go down if the BLLM based modified content may lose its relevance (and even eventually phased out), in terms of questions not being asked or not being popular anymore.

Figure 10:
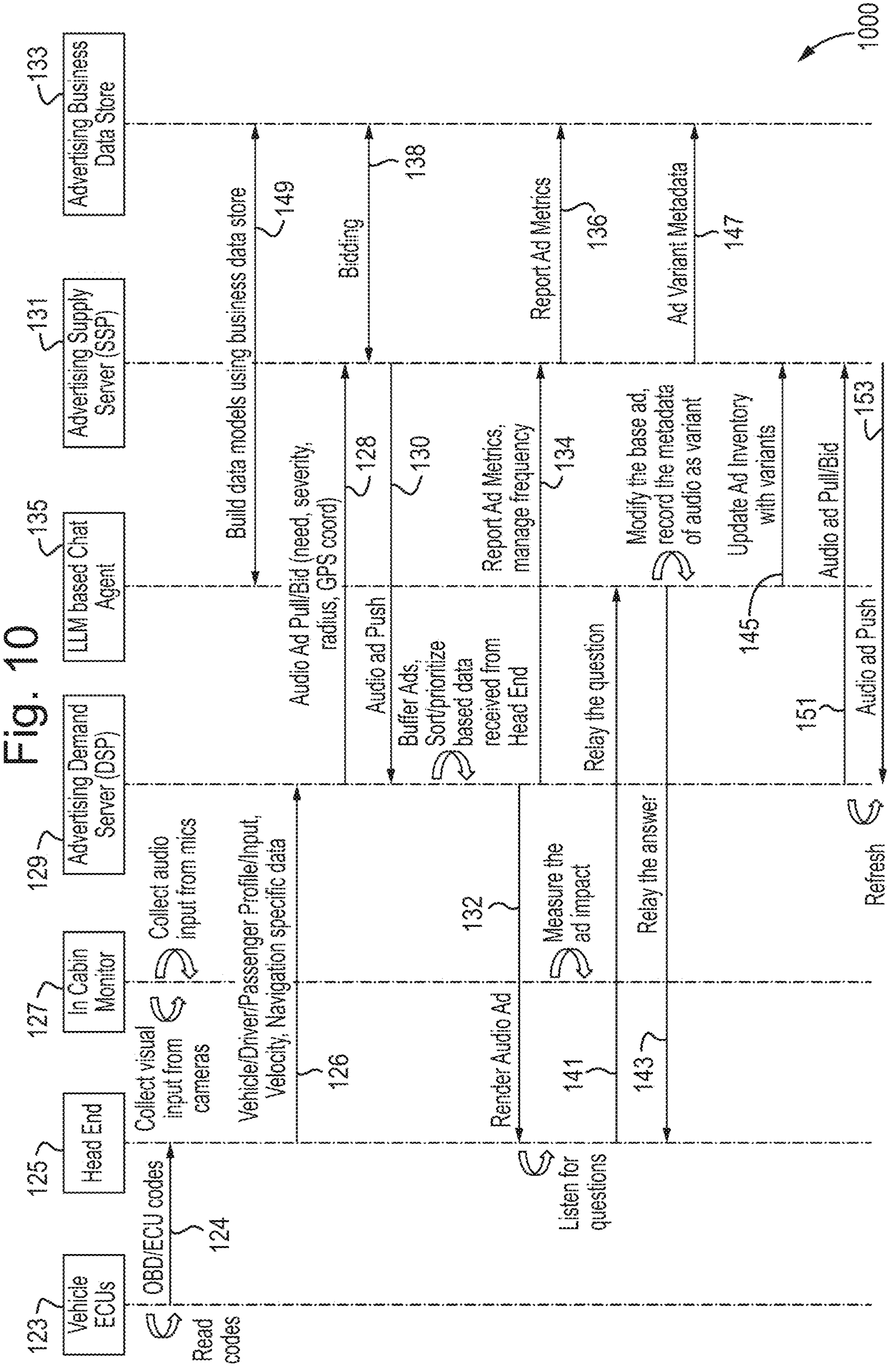
FIG. 10 depicts an exemplary sequence diagram according to the present disclosure.

FIG. 10 illustrates an exemplary sequence diagram 1000 according to the present disclosure. It is noted that in this exemplary embodiment, the sequence relates to a method of providing advertisement to occupants of a vehicle, but it should be appreciated that this is non-limiting and in other embodiments other types of media content such as streaming media content, gaming content or any type of media content may be provided. The method may be implemented, in whole or in part, by the system 1001 shown in FIG. 11. One or more actions of the method may be incorporated into or combined with one or more actions of any other method or embodiments described herein. The method may be saved to a memory or storage (such as any one or more of those shown in FIGS. 11) as one or more instructions or routines that may be executed by a corresponding device or system to implement the method.

In a first step, OBD/ECU codes are obtained from a vehicle's ECU 123. At step 124, the OBD/ECU codes may be transmitted by using a wired connection or wireless connection to a head end unit 125 of the vehicle. An in-can monitoring system 127 implemented in the cabin of the vehicle may collect image data from at least one camera in the cabin and/or audio data from at least one microphone located in the cabin. The image data and the audio data may be associated with occupants in the vehicle. For example, data collected by in-can monitoring system 127 may indicate the occupants age, gender and other physical characteristics. At step 126, the collected data including the OBD/ECU codes and the video/audio data may be transmitted to a sever (e.g. DSP) 129. Optionally, additional data such as profile data associated with the vehicle and/or the occupants, input from the vehicle and/or the occupants, speed data, navigation specific data or other type of data associated with a current use state of a vehicle may also be transmitted to the DSP 129. The DSP 129 may analyse the data to identify a contextual event regarding the vehicle. Subsequently, at step 128, the DSP 129 may transmit a request to an Advertising Supply Sever (SSP) 131 for an audio advertisement data. At step 130, the SSP 131 then provides data including audio advertisement data to the DSP 129. In some embodiments, if the supplied data contains advertisement data in video format, the supplied data is converted to audio format as explained before. Content in video format may be played for non-driver occupants in the vehicle such as passengers, on displays such as those that are on the back of head rest or their smart devices. The DSP 129 sort and prioritize the audio advertisement data based on the identified contextual event and generate based on the audio advertisement data an audio advertisement item for delivery to the occupants of the vehicle and transmits the data to the head end at step 132. The in-cabin monitoring system 127 may measure the advertisement impact by analysing the reaction of the occupants to the provided advertisement item and reports metrics such as advertisement specific metrics and frequency of delivery of ads to the SSP 131, either directly or via DSP 129 as show in step 134. The SSP 131 reports the advertisement specific metrics to an Advertising Business Data Store 133 for future management and reference at step 136. The Advertising Business Data Store 133 may also allow bidding of advertisement from various sponsors and vendors at the stage (i.e. step 138) where the SSP 131 provides data including audio advertisement data to the DSP 129.

In some embodiments, after providing the audio advertisement item to the occupants, the head end unit 125 may listen for questions from the occupants for a period of time and relay any questions from the occupants to an LLM based chat agent 135 at step 141. At step 143, the LLM based chat agent 135 may analyse the question and relay an answer to the head end unit for delivery to the occupants. The chat agent 135 may also modify the audio advertisement item (i.e. base variant) to generate a new variant of the audio advertisement item which may include information about the answer provided to the occupant. At step 145, the chat agent may record the metadata of the newly generated variant and update the advertisement inventory in the SSP 131 with the new variant. At step 147, the SSP 131 may transmit the metadata associated with the variant to the Advertising Business Data Store 133. This allows measuring the user's interest to that specific variant. For instance, if the user had a more favourable reaction to a certain variant of the media content, a feedback based on this reaction may be relayed to relevant business. Optionally in future the SSP 131 may provide content media similar to a variant with positive reaction more frequently to the user. In some embodiments, the LLM based chat agent 135 may build data models using the data in the Advertising Business Data Store 133 at step 149. The process of Audio advertisement pulling and bidding and Audio advertisement pushing may then refresh and repeat upon receiving operational parameters or occupant parameters, for example is steps 151 and 153.

FIG. 11 illustrate a system 1001 in a vehicle 102 according to one or more embodiments. The system 1001 comprises an OBD-II port 103, an ECU 105, a control circuitry 101 comprising a processor 115 and a memory 113, an in-cabin Monitoring system 109, and an output system 113. The output system may comprise at least one of in-vehicle speakers, an in-vehicle infotainment display, an in-vehicle instrument cluster, an HUD or smartphones connected directly or indirectly via a server to the control circuitry. The OBD-II port 103 and ECU 105 may be connected to and provide data regarding the status of the vehicle 102 to the control circuitry 101 (e.g., the first data described with reference to FIG. 1). The In-Cabin Monitoring System 109 may include at least one sensor such as camera and/or microphone. The In-Cabin Monitoring System 109 may be connected to and provide data regarding the occupant of the vehicle 102 to the control circuitry 101. The control circuitry 101 may store the received data in memory 113 and process the data by using processor 115. The control circuitry 103 may provide an output data including media content data for the occupants of the vehicle 102 to output system 117. The output system 117 may receive the output data and provide the media content to the occupants of the vehicle 102. The control circuitry 101 may cause the output system 117 to provide the media content in a manner that accounts for contextual events, identified based on data received from the OBD-II 103, the ECU 105, or the in-cabin monitoring system 109, for example, relating to the vehicle 102. For example, a low tire pressure may be detected via the ECU 105, resulting in the display of content at the output system 117 indicating a nearby establishment with an air compressor (e.g., a gas station). To display the content, the control circuitry 101 may first request relevant content data (e.g., from a server) based on the contextual event. Relevant media content data may then be received by the control circuitry 101, which may then generate the content based on the received content data. For example, regarding the provided content, the name of the gas station may be displayed, the gas station's logo may be displayed, a map showing the gas station's location may be displayed, a navigation path from the current location of the vehicle 102 to the gas station's location may be displayed, an audio or video commercial or advertisement for the gas station may played, audio directions to the gas station may be provided, haptic feedback may be provided via the steering wheel to gain the driver's attention, or a heads up display may project navigation instructions (e.g., via arrows on the heads-up display). In some instances, a severity or urgency of the contextual event may be identified or determined by the control circuitry 101, which may be accounted for when presenting the media content (e.g., to prioritize the most significant contextual events). For example, a contextual event may be a low gas level. is likely represents a more urgent or severe event, and thus may be displayed more prominently, or instead of, a low tire pressure alert. If desired, the determined urgency or severity may be indicated to the user (e.g., via a visual symbol or style, an image, a video, or an audio notification or message). By providing media content relating to contextual events of the vehicle 102 determined from on-board diagnostics systems of the vehicle 102, the control circuitry 101 can provide content highly relevant to the current state of the vehicle 102, which is likely relevant to the driver's or passenger's immediate concerns. Because some contextual events relate to potentially dangerous or problematic states of the vehicle 102 and its occupants, the described techniques may help ensure the safety of occupants. For example, by nudging a driver to take actions that may help the driver avoid having her vehicle break down in remote locations where she might be stranded, the driver's safety may be ensured.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Only the claims that follow are meant to set bounds as to what the present disclosure includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

obtaining, using control circuitry, first data associated with a current use state of a vehicle;

analyzing, using control circuitry, the first data to identify a contextual event regarding the vehicle;

in response to identifying the contextual event, identifying an urgency value associated with the contextual event;

based at least in part on determining the urgency value exceeds a predetermined threshold value, determining an urgency of the contextual event is within a high tier of urgency;

requesting, using control circuitry, second data comprising media content data, wherein the media content data comprises a media content queue sequence;

generating, using control circuitry, based on the media content data, a first media content item relevant to the identified contextual event, wherein the first media content item is selected based at least in part on a location of the vehicle relative to a location associated with the first media content item;

based at least in part on determining the urgency of the contextual event is within the high tier of urgency, prioritizing the first media content item relevant to the identified contextual event before a second media content item in the media content queue sequence; and providing, using control circuitry, the first media content item for consumption by the targeted occupant of the vehicle before the second media content item in the media content queue sequence.

2. The method of claim 1, wherein the first data comprises at least one of location data, velocity data, diagnostic data, vehicle control data, physical health data, mood data, speech data or image data indicative of a state of occupants of the vehicle.

3. The method of claim 1, wherein determining the urgency of the contextual event comprises:

comparing the identified urgency value with a predefined urgency scale comprising a minimum value and a maximum value, wherein the minimum value corresponds to a low tier of urgency and the maximum value corresponds to the high tier of urgency.

4. The method of claim 1, further comprising:

determining whether a targeted occupant of the vehicle is a passenger of the vehicle; and determining a format of the first media content item based on the occupant of the vehicle being the passenger of the vehicle.

5. The method of claim 1, comprising:

receiving a user query relating to the first media content item;

analyzing the user query using a machine learning model;

generating a variant of the first media content item based on the user query and an output of the machine learning model;

sorting the generated variant in a media content item data set; and collecting data indicative of a response by one or more occupants to the generated variant.

6. The method of claim 1, further comprising:

detecting an error code associated with the vehicle in the first data, wherein the error code is indicative of a fault in the vehicle.

7. The method of claim 1, further comprising:

modifying the media content queue sequence based on the determined urgency of the contextual event.

8. The method of claim 1, based at least in part on determining the urgency of the contextual event is within the high tier of urgency, the method further comprising:

selecting, using the control circuitry, the media content data based on a radius distance from current location data of the vehicle to a business that is associated with resolving the identified contextual event; and generating, using control circuitry, based on the media content data, a selected media content item in the radius distance from the current location data of the vehicle to the business.

9. The method of claim 1, further comprising:

filtering the media content data based on one or more business type categories selected by an occupant of the vehicle, wherein the media content queue sequence excludes media content items associated with the one or more business type categories not selected by the occupant.

10. The method of claim 1, wherein the first media content item is delivered in an audio format, the method further comprises:

deferring providing the first media content item until it is detected that no navigation instruction is currently being played and no human chatter is detected in a cabin of the vehicle.

11. A system comprising control circuitry configured to:

obtain first data associated with a current use state of a vehicle;

analyze the first data to identify a contextual event regarding the vehicle;

in response to identifying the contextual event, identify an urgency value associated with the contextual event;

based at least in part on determining the urgency value exceeds a predetermined threshold value, determine an urgency of the contextual event is within a high tier of urgency;

request second data comprising media content data, wherein the media content data comprises a media content queue sequence;

generate based on the media content data, a first media content item relevant to the identified contextual event, wherein the first media content item is selected based at least in part on a location of the vehicle relative to a location associated with the first media content item;

based at least in part on determining the urgency of the contextual event is within the high tier of urgency, prioritize the first media content item relevant to the identified contextual event before a second media content item in the media content queue sequence; and provide the first media content item for consumption by the targeted occupant of the vehicle before the second media content item in the media content queue sequence.

12. The system of claim 11, wherein the first data comprises at least one of location data, velocity data, diagnostic data, vehicle control data, physical health data, mood data, speech data or image data indicative of a state of occupants of the vehicle.

13. The system of claim 11, wherein the control circuitry is further configured to:

compare the identified urgency value with a predefined urgency scale comprising a minimum value and a maximum value, wherein the minimum value corresponds to a low tier of urgency and the maximum value corresponds to the high tier of urgency.

14. The system of claim 11, wherein the control circuitry is further configured to:

determine whether a targeted occupant of the vehicle is a passenger of the vehicle; and determine a format of the first media content item based on the occupant of the vehicle being the passenger of the vehicle.

15. The system of claim 11, wherein the control circuitry is further configured to:

receive a user query relating to the first media content item;

analyze the user query using a machine learning model;

generate a variant of the first media content item based on the user query and an output of the machine learning model;

sort the generated variant in a media content item data set; and collect data indicative of a response by one or more occupants to the generated variant.

16. The system of claim 11, wherein the control circuitry is further configured to:

detect an error code associated with the vehicle in the first data, wherein the error code is indicative of a fault in the vehicle.

17. The system of claim 11, wherein the control circuitry is further configured to:

modify the media content queue sequence based on the determined urgency of the contextual event.

* * * * *